United States Patent
Layouni et al.

(10) Patent No.: US 9,868,276 B2
(45) Date of Patent: Jan. 16, 2018

(54) METHOD OF TREATING JOINT IN CERAMIC ASSEMBLY

(71) Applicant: Corning Incorporated, Corning, NY (US)

(72) Inventors: Khaled Layouni, Moncourt-Fromonville (FR); Yanxia Ann Lu, Painted Post, NY (US); Paulo Gaspar Jorge Marques, Le Chatelet en Brie (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/361,375

(22) PCT Filed: Nov. 28, 2012

(86) PCT No.: PCT/US2012/066719
§ 371 (c)(1),
(2) Date: May 29, 2014

(87) PCT Pub. No.: WO2013/082063
PCT Pub. Date: Jun. 6, 2013

(65) Prior Publication Data
US 2014/0334869 A1    Nov. 13, 2014

Related U.S. Application Data

(60) Provisional application No. 61/564,511, filed on Nov. 29, 2011.

(51) Int. Cl.
*B32B 37/00* (2006.01)
*C04B 33/34* (2006.01)
(Continued)

(52) U.S. Cl.
CPC ........ *B32B 38/0036* (2013.01); *C04B 37/005* (2013.01); *B32B 2038/0052* (2013.01);
(Continued)

(58) Field of Classification Search
CPC ........ B32B 38/0036; B32B 2038/0052; B32B 2309/02; C04B 2237/365; C04B 2237/08;
(Continued)

(56) References Cited

U.S. PATENT DOCUMENTS 4,921,554 A    5/1990 Bates et al.
4,925,608 A    5/1990 Rossi et al.
(Continued)

FOREIGN PATENT DOCUMENTS

FR    2949696 A1 *  3/2011
GB    2423957 A     9/2006
(Continued)

OTHER PUBLICATIONS

Kuroda et al., "JP 2007-44713, machine translation", published Feb. 22, 2007.*
(Continued)

*Primary Examiner* — Alex Efta
(74) *Attorney, Agent, or Firm* — Gregory V. Bean

(57) ABSTRACT

A method of forming an improved sealed joint between two or more shaped ceramic structures includes providing at least first and second ceramic structures joined together by a joint comprising one or more of silicon, a silicon alloy and a silicon compound, the joint including an exposed portion interior of the joined structures, then converting at least a portion of the one or more of silicon, a silicon alloy, and a silicon compound of the joint to silicon nitride and/or silicon carbide, desirably at least at an interior exposed portion of the joint, so as to provide increased chemical resistance for the joint when aggressive chemicals are used within device (Continued)

formed from the sealed-together ceramic structures. The ceramic structures desirably comprise silicon carbide.

13 Claims, 2 Drawing Sheets

(51) Int. Cl.
    *C03B 29/00* (2006.01)
    *B32B 38/00* (2006.01)
    *C04B 37/00* (2006.01)

(52) U.S. Cl.
    CPC ....... *B32B 2309/02* (2013.01); *B32B 2309/04* (2013.01); *B32B 2309/60* (2013.01); *C04B 2235/46* (2013.01); *C04B 2235/658* (2013.01); *C04B 2235/6562* (2013.01); *C04B 2235/6567* (2013.01); *C04B 2235/662* (2013.01); *C04B 2235/9692* (2013.01); *C04B 2237/08* (2013.01); *C04B 2237/083* (2013.01); *C04B 2237/16* (2013.01); *C04B 2237/343* (2013.01); *C04B 2237/365* (2013.01); *C04B 2237/368* (2013.01); *C04B 2237/708* (2013.01); *C04B 2237/88* (2013.01); *Y10T 156/10* (2015.01); *Y10T 403/477* (2015.01)

(58) Field of Classification Search
    CPC ..... C04B 35/584; C04B 35/591; C04B 35/65; C04B 2235/46; C04B 2237/61
    See application file for complete search history.

(56) References Cited

U.S. PATENT DOCUMENTS

| | | | |
|---|---|---|---|
| 5,407,504 A | 4/1995 | Ewart-Paine | |
| 5,451,279 A * | 9/1995 | Kohinata et al. | 156/89.27 |
| 5,571,758 A * | 11/1996 | Grossman | C04B 35/806 |
| | | | 423/345 |
| 8,003,557 B2 | 8/2011 | Levoy et al. | |
| 2003/0057581 A1 * | 3/2003 | Lu | C04B 38/0006 |
| | | | 264/30 |
| 2008/0131665 A1 * | 6/2008 | Suyama | B82Y 30/00 |
| | | | 428/149 |
| 2008/0226868 A1 | 9/2008 | Pickering et al. | |
| 2009/0151917 A1 | 6/2009 | Meschke et al. | |
| 2009/0249999 A1 | 10/2009 | Roligheten et al. | |
| 2009/0280299 A1 * | 11/2009 | Ferrrato | B23K 1/0012 |
| | | | 428/157 |
| 2010/0139841 A1 * | 6/2010 | Siegel | C04B 35/573 |
| | | | 156/89.26 |
| 2011/0229711 A1 * | 9/2011 | Garandet | B23K 35/005 |
| | | | 428/323 |
| 2011/0274874 A1 | 11/2011 | Pickering et al. | |
| 2012/0308839 A1 * | 12/2012 | Chaumat et al. | 428/450 |

FOREIGN PATENT DOCUMENTS

| | | | |
|---|---|---|---|
| JP | 0745341 B | | 10/1991 |
| JP | 5085971 A | | 4/1993 |
| JP | 2007044713 A | * | 2/2007 |
| JP | 2007055851 A | | 3/2007 |
| JP | 2010024122 A | | 2/2010 |

OTHER PUBLICATIONS

CN201280067634.8 First Office Action dated Jun. 18, 2015.
CN201280067634.8 Second Office Action dated Apr. 25, 2016.
EP12808567.7 Office Action dated Jun. 30, 2016; 7 pages; European Patent Office.
International Search Report and Written Opinion of the International Search Report; PCT/US2012/066719; dated Feb. 15, 2013; 9 pages.

* cited by examiner

METHOD OF TREATING JOINT IN CERAMIC ASSEMBLY

CROSS-REFERENCE TO RELATED APPLICATIONS

This application claims the benefit of priority under 35 U.S.C. §371 of International Application Serial No. PCT/US12/66719, filed on Nov. 28, 2012, which, in turn, claims the benefit of priority of U.S. Provisional Application Ser. No. 61/564,511 filed Nov. 29, 2011 the content of which is relied upon and incorporated herein by reference in their entireties as if fully set forth below.

FIELD

The present disclosure relates to methods of treating a joint between two ceramic pieces in an assembly of ceramic pieces, and particularly to methods of treating a joint between two ceramic pieces in an assembly of ceramic pieces so as to increase the chemical durability of the joint, where the joint comprises one or more of silicon, a silicon alloy, and a silicon compound.

SUMMARY

Microreactors, or continuous flow reactors having channels micrometer—up to tens of millimeter-scale minimum dimensions, offer many advantages over conventional batch reactors, including very significant improvements in energy efficiency, reaction condition control, safety, reliability, productivity, scalability, and portability. In such a microreactor, the chemical reactions take place continuously, generally in confinement within such channels.

For durable microreactors, high chemical resistance is essentials when corrosive compounds are employed such as mineral acids or caustic solutions. High thermal diffusivity is also desired due to the heat transfer requirements of highly exothermic or endothermic reactions.

Glass and ceramic materials such as Pyrex®, and alumina, for example, are currently used in making microreactors. However, glass is vulnerable to attack by strong base solutions, and thermal conductivity of both glass and even alumina is lower than desirable for some applications. In many microreactor applications, strong base solutions are used as a reactant or to quench a reaction which involves acids, and resistance to strong base solutions, particularly at elevated temperatures, is needed.

Silicon carbide (SiC) has both excellent chemical resistance and high thermal conductivity, but it is generally very costly to make. Particularly difficult and/or expensive is forming the joints between silicon carbide plates when making microreactors having enclosed channels formed by sealing two or more plates together.

One way to join SiC plates is thermal diffusion between the SiC plates at high temperature such as 2200° C., generally requiring high pressure inert atmosphere and/or significant mechanical pressure which can be difficult or expensive to apply at such high temperatures.

Another potential way to join SiC plates is to form reaction bonded SiC at the relatively lower temperature of 1800° C., but reaction bonded SiC does not resist hot alkaline solutions such as NaOH or KOH.

Yet another way to join SiC plates is to fuse the plates together with a silicon-based braze. This forms a mechanically strong joint at a relatively low processing temperature such as 1450° C., but also does not resist high temperature strong base solutions such as NaOH or KOH.

The present disclosure provides a method of forming an improved sealed joint between two or more shaped ceramic structures. The method includes the following steps. First, providing at least first and second ceramic structures joined together by a joint comprising one or more of silicon, a silicon alloy and a silicon compound. The joint includes an exposed portion exposed on the exterior and/or interior of the joined structures. Second, converting at least a portion of the one or more of silicon, a silicon alloy, and a silicon compound of the joint to silicon nitride and/or silicon carbide. The conversion should be performed at least at an interior exposed portion of the joint, so as to provide increased chemical resistance for the joint when aggressive chemicals are used within a device formed from the sealed-together ceramic structures.

Certain variations and embodiments of the method of the present disclosure are described in the text below and with reference to the figures, described in brief immediately below.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
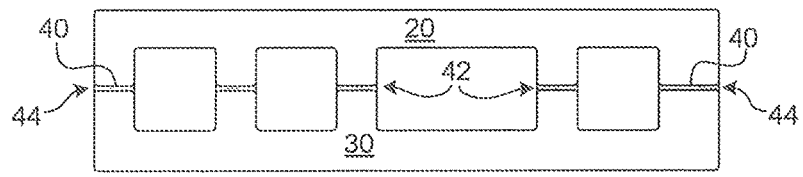
FIG. 1 is a schematic cross-section of a ceramic assembly with a silicon-based joint useful with the methods of the present disclosure.

These results and other beneficial results can be obtained by the methods of the present disclosure, which will be described with general reference to FIGS. 1-3.

According to one aspect of the present disclosure, a method is provided for forming an improved sealed joint between at least first and second formed or shaped ceramic structures. The method includes providing at least first and second ceramic structures, such as first and second ceramic structures 20, 30 of FIG. 1, already joined together by a joint 40 comprising one or more of silicon, a silicon alloy and a silicon compound. The joint 40 includes an exposed portion exposed on the interior of the resulting assembly 10 (resulting from the previous joining of the at least first and second joined ceramic structures 20, 30) as well as, typically, exposed portions 44 on the exterior of the assembly. The method includes converting at least a portion of the one or more of silicon, a silicon alloy, and a silicon compound of the joint 40 to silicon nitride and/or silicon carbide. The conversion should be performed at least at an interiorly exposed portion of the joint 42, so as to provide increased chemical resistance for the joint 40 when aggressive chemicals are used within the assembly formed from the sealed-together ceramic structures 20, 30.

The joint 40 between the ceramic structures 20, 30 of FIG. 1 is desirably created, in the first place, by brazing the first and second ceramic structures together using a brazing material comprising one or more of silicon, a silicon alloy and a silicon compound. A desirable process by which this may be performed is the process described in Patent Publication No. US20090280299 (Corresponding to Patent EP2066474), entitled Process For Manufacturing a Silicon Carbide Heat Exchanger Device, and Silicon Carbide Device Produced by the Process. As described in US20090280299, two or more ceramic structures may be joined together by process that includes stacking the structures together while in a green state, in the configuration to be used for joining the structures, then firing the structures together while so stacked. This method reduces variations in the gaps between adjoining pieces, and allows for the additional step of brazing the ceramic structures together without any grinding and/machining after the step of sintering. Avoiding grinding and machining the surfaces to be joined, after sintering, may provide a stronger, more durable joint according to one alternative of the process disclosed in the present application. As an alternative for use within the context of the presently disclosed process, however, grinding and/or machining after sintering and before brazing may be used if desired in appropriate cases. The method of US20090280299 is particularly applied therein to the formation and sealing of silicon carbide (SiC) structures. The methods of the present disclosure are also particularly desirable for application to SiC structures, although they may potentially provide advantage with other materials as well, such as silicon nitride, alumna, and potential other ceramic and/or refractory materials.

Figure 2:
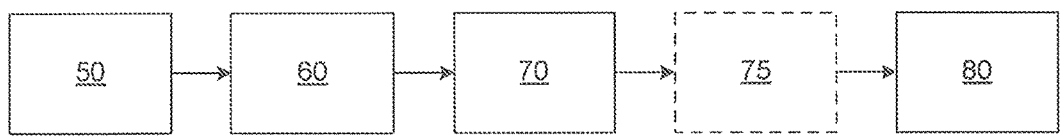
FIG. 2 is a flow diagram of steps in the methods of the present disclosure.

As illustrated in the simple flow diagram of FIG. 2, according to an aspect of the present disclosure, providing, in step 50 of the diagram, the at least two (the first and second) ceramic structures with the joint therebetween, as at least a portion of the silicon, silicon alloy, or silicon compound of the joint is converted to silicon nitride and/or silicon carbide by the step 60 of heating the at least two ceramic structures and the joint to a temperature within the range of 1300 to 1450° C. in an inert atmosphere, then in step 70 switching from an inert to a reactive atmosphere. The inert atmosphere may be at atmospheric pressure, or may be a pressurized inert atmosphere above atmospheric pressure. The reactive atmosphere may include a mixture of different gases.

In an alternative of the present disclosure in which at least a portion of the silicon, silicon alloy, or silicon compound of the joint is converted to silicon nitride, the reactive atmosphere desirably comprises nitrogen or nitrogen and hydrogen. In alternative of the present disclosure in which at least a portion of the silicon, silicon alloy, or silicon compound is converted to silicon carbide, the reactive atmosphere comprises one or more carbonaceous gases.

In a optional step 75 applicable with any of the alternative methods of the present disclosure, after switching to a reactive atmosphere, the two or more second ceramic structures and the joint may be maintained at a temperature within the range of 1300 to 1450° C. for a holding period in the range of from 1 to 4 hours. With or without this optional step, it is desirable, after switching to a reactive atmosphere, to ramp the temperature of the first and second ceramic structures and the joint up to a temperature ranging from 1500 to 1600° C. in a step 80, alternatively at least to a temperature greater than a melting point of the one or more of silicon, a silicon alloy, and a silicon compound of the joint.

Figure 3:
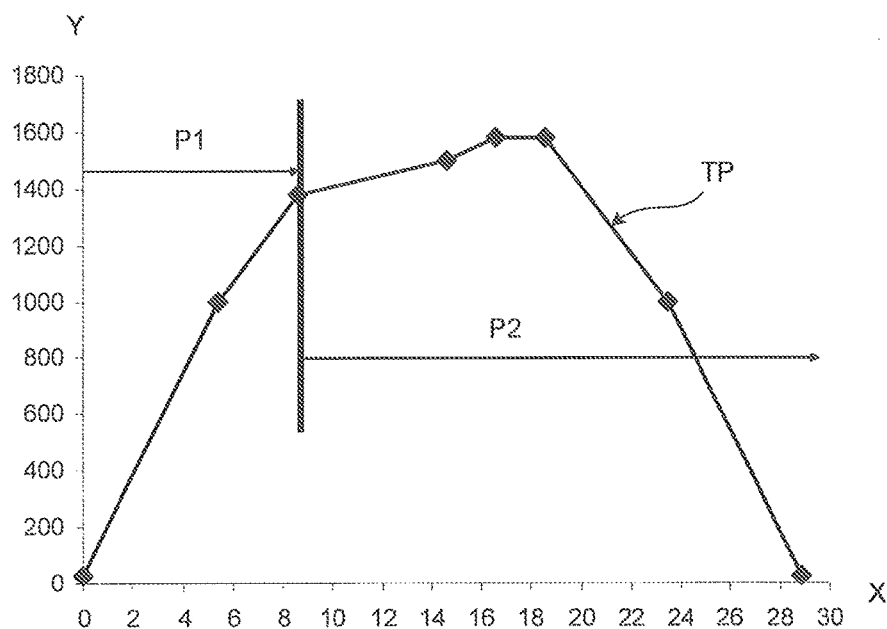
FIG. 3 is one instance of a temperature profile that may be used in the methods of the present disclosure.

FIG. 3 shows a temperature profile TP graphed in degrees Celsius on the Y axis as a function of time in hours on the X axis. During a first period P1, including a temperature ramp or increase from around 0 degrees Celsius, or around room temperature, to about 1400 degrees Celsius, the two or more ceramic structures and the joint therebetween are heated in an inert atmosphere. During a second period P2, the ceramic structures and the joint therebetween are kept in a reactive atmosphere comprising a least one of nitrogen and carbonaceous gases so as to convert at least an interiorly exposed portion of the joint to at least one of silicon carbide and silicon nitride. As shown, P2 desirably includes a further increase of temperature beyond that occurring during P1, desirably to a temperature ranging from 1500 to 1600° C. as mentioned above.

Silicon Nitride Examples

The examples below show the formation of silicon nitride ($Si_3N_4$) joint between silicon carbide (SiC) ceramic structures. The $Si_3N_4$-jointed SiC is a potential material for microreactors (flow reactors having millimeter to 10's of millimeter-scale flow channel widths) because it provides high thermal diffusivity and excellent chemical resistance under application conditions (i.e., temperatures from −200° C. to 300° C.). The $Si_3N_4$ joint is formed by nitriding a silicon (Si) joint which already exists between the SiC structures, with the joint thickness from about 2-3 micrometers up to about 50-70 micrometers depending on the starting thickness of the silicon-based joint. After nitridation, the $Si_3N_4$ joint has the same or similar thickness as the pre-existing joint.

The nitridation process includes three major steps: 1) soften the Si joint (or maximize the silicon surface activity) by bringing the joint near its melting point (silicon melting point: 1410° C.) in an inert-gas environment, such as in Argon, or Helium or in mixtures of inert gases 2) Switch to pure $N_2$ gas at a temperature below the melting point of the joint; 3) Continue to heat up to approximately 1600° C. for more complete nitridation and for strengthening the $Si_3N_4$ bond. Due to the dense layer of silicon metal, the nitridation begins at the exposed surface of the silicon and then continues into the interior of the joint. The firing profiles according to the present disclosure help to maintain the original shape of the joint, such as the thickness, and complete the nitridation with strong bonding.

In the structures resulting from this process, the $Si_3N_4$ plays a function of "glue" between two surfaces of SiC structures; the $Si_3N_4$ bond is formed at surfaces of SiC particles where they were bonded previously with the silicon of the joint. This type of bond is different from $Si_3N_4$-bonded SiC composites, where the SiC particles may typically bonded with $Si_3N_4$ in all directions (or at multiple points) surrounding each SiC particle. Due to the limited bonding with SiC particle surface in the present processes, the $Si_3N_4$ bond has to be strong, which is accomplished by nitridation of silicon metal surface that is at liquid or viscous state. The resulting $Si_3N_4$ joint is pure reaction-formed silicon nitride, so it posses high strength, high fracture toughness, good thermal conductivity, good thermal shock resistance and good chemical durability. It resists to most acids and base solutions.

Figure 4:
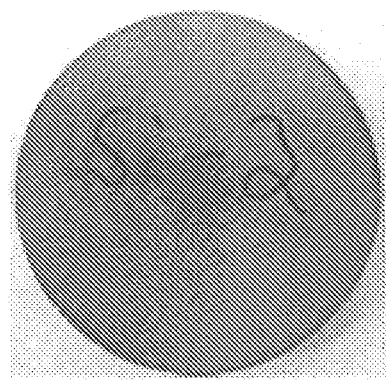
FIGS. 4 and 5 are photographs of a test assembly having a joint improved by methods of the present disclosure, before and after corrosion testing.
Figure 5:
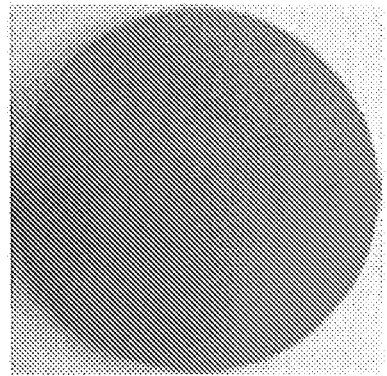

A corrosion resistance test proved the strong bond between the $Si_3N_4$ and SiC components achieved by the present methods. The joint is superior to silicon joint in terms of corrosion resistance, as was shown by a corrosion test in a strong base solution at elevated temperature (NaOH 30% w at 220° C. for 160 hours). A reference sample (Silicon based SiC—no nitridation) was obtained from Boostec SA Company. The samples consisted of two plates of dense Silicon Carbide brazed with a patented Silicon alloy BraSiC® joint Both references sample and invented sample were submitted to attack of base media (NaOH 30% w, 220° C. during 160 hours). Sample SiC pieces with the standard silicon-based joint were completely separated, the joint material dissolved. In contrast, SiC samples connected by a joint produced according to methods of the present disclosure remained joined, with some corrosion visible at the joint, but with the joint as a whole still intact. This is shown in the digital photographic images of FIGS. 4 and 5. FIG. 4 is a picture of a sample treated according to the methods of the present dislcosure. (In the disc of FIG. 4, the $Si_3N_4$ joint is in the middle of the disc and joins two semi-circles.) FIG. 5 is a picture of the assembly of FIG. 4 after corrosion test in NaOH 30% w at 220° C. for 160 hours). Some corrosion of the joint (horizontal line) is visible, but the joint remains intact.

In order to provide good nitridation effects while avoiding the loss of any areas of the joint, the following temperature profile may be used: Fire in an Ar environment up to 1380° C., then switch to $N_2$ gas without temperature holding. After changing to $N_2$ environment, continue heating at low rate, such as 20° C./hour, up to 1500° C., then finally holding 1580° C. for 2 hours. Optical images have shown that the joint has the same shape as the starting silicon joint. Accordingly, it appears there is no loss of joint at this firing condition.

Figure 6:
FIGS. 6 and 7 are comparative photographs of disc of commercially available bulk silicon nitride, before and after corrosion testing.
Figure 7:
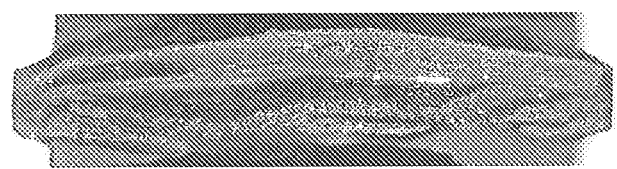

Interestingly, the $Si_3N_4$ joint produced according to the present disclosure is more chemically durable than commercially available silicon nitride structures. FIGS. 6 and 7 are before and after photographs of a disk of commercially available silicon nitride subjected to the same test as the joint shown in FIGS. 4 and 5. The structural integrity of the disk of bulk silicon nitride is significantly compromised by the test.

Many types of useful articles may be made according to the methods described herein, including crucibles, heat exchangers, and vessels or other structures for performing various types of chemical or physical processes. The methods are particularly useful and intended for forming a flow reactor or modules for use in a flow reactor, particularly for reactions requiring or particularly benefiting from high heat transfer rates and extremely high chemical durability.

The methods disclosed herein and the devices produced thereby are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method for forming a sealed joint between at least first and second formed or shaped ceramic structures, the method comprising:
   a) providing at least first and second joined ceramic structures, the first and second joined ceramic structures comprising silicon carbide and being joined together by a joint therebetween, the joint comprising one or more of silicon, a silicon alloy and a silicon compound, the joint including an exposed portion;
   b) converting at least a portion of the one or more of silicon, a silicon alloy, and a silicon compound of the joint to silicon nitride,
   wherein the step of converting at least a portion of the silicon, silicon alloy, or silicon compound of the joint to silicon nitride comprises heating in an inert atmosphere the at least first and second ceramic structures and the joint, to a temperature greater than 1300° C. and less than a melting point of the one or more of silicon, a silicon alloy, and a silicon compound of the joint, then, while the temperature is still less than the melting point of the one or more of silicon, a silicon alloy, and a silicon compound of the joint, switching from an inert to a reactive atmosphere, then, after switching to a reactive atmosphere, ramping the temperature of the first and second ceramic structures and the joint from less than the melting point of the one or more of silicon, a silicon alloy, and a silicon compound of the joint to greater than the melting point of the one or more of silicon, a silicon alloy, and a silicon compound of the joint.

2. The method according to claim 1 wherein the step of converting comprises converting the one or more of silicon, a silicon alloy, and a silicon compound of the joint to silicon nitride at the exposed portion of the joint.

3. The method according to claim 1 wherein the step of providing at least first and second ceramic structures having a joint therebetween further comprises brazing the first and second ceramic structures together using a brazing material comprising one or more of silicon, a silicon alloy and a silicon compound.

4. The method according claim 1 wherein the step of providing the at least first and second ceramic structures having a joint there between comprises stacking the at least first and second structures together while in a green state, in the configuration to be used for joining the first and second ceramic structures, then firing said structures together while stacked in said configuration.

5. The method according to claim 4 wherein the step of providing the at least first and second ceramic structures having a joint therebetween further comprises, after firing, brazing said at least first and second ceramic structures together without any grinding or machining.

6. The method according to claim 4 wherein the step of providing the at least first and second ceramic structures having a joint therebetween further comprises grinding and/or machining after firing followed by brazing.

7. The method according to claim 1 wherein the step of converting at least a portion of the silicon, silicon alloy, or silicon compound of the joint to silicon nitride comprises heating the at least first and second ceramic structures and the joint in a pressurized inert atmosphere.

8. The method according to claim 1 wherein the reactive atmosphere comprises a mixture of different gases.

9. The method according to claim 1 further comprising, after switching to a reactive atmosphere, maintaining the first and second ceramic structures and the joint at a temperature within the range of 1300 to 1450° C. for a holding period in the range of from 1 to 4 hours.

10. The method according to claim 1 further comprising, after switching to a reactive atmosphere, ramping the temperature of the first and second ceramic structures and the joint to a temperature ranging from 1500 to 1600° C.

11. The method according to claim 1, the reactive atmosphere comprising nitrogen or nitrogen and hydrogen.

12. An article made according to the method of claim 1.

13. A flow reactor comprising one or more articles of claim 12.

* * * * *

UNITED STATES PATENT AND TRADEMARK OFFICE
CERTIFICATE OF CORRECTION

PATENT NO. : 9,868,276 B2  
APPLICATION NO. : 14/361375  
DATED : January 16, 2018  
INVENTOR(S) : Khaled Layouni et al.

Page 1 of 1

It is certified that error appears in the above-identified patent and that said Letters Patent is hereby corrected as shown below:

On the Title Page

On page 2, Column 2, Line 15, item [56], delete "Garandet" and insert -- Garandet et al. --, therefor.

In the Claims

Column 7, Line 15, Claim 4, after "according" insert -- to --.

Signed and Sealed this  
Twenty-eighth Day of January, 2020

Andrei Iancu  
*Director of the United States Patent and Trademark Office*